(12) United States Patent
Owoeye et al.

(10) Patent No.: US 11,753,995 B1
(45) Date of Patent: Sep. 12, 2023

(54) HYDROGEN-EXHAUST GAS HEAT EXCHANGER OF A TURBOFAN ENGINE

(71) Applicant: General Electric Company, Schenectady, NY (US)

(72) Inventors: Eyitayo James Owoeye, Houston, TX (US); William Morton, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/730,570

(22) Filed: Apr. 27, 2022

(51) Int. Cl.
| | | |
|---|---|---|
| *F02C 7/224* | (2006.01) | |
| *F02C 3/22* | (2006.01) | |
| *F02C 7/143* | (2006.01) | |
| *F02C 9/40* | (2006.01) | |
| *F02C 7/18* | (2006.01) | |

(52) U.S. Cl.
CPC ............ *F02C 7/224* (2013.01); *F02C 3/22* (2013.01); *F02C 7/143* (2013.01); *F02C 7/185* (2013.01); *F02C 9/40* (2013.01); F05D 2220/323 (2013.01); F05D 2260/211 (2013.01); F05D 2260/213 (2013.01)

(58) Field of Classification Search
CPC .......... F02C 7/224; F02C 7/143; F02C 7/185; F02C 3/22; F02C 9/40; F05D 2260/2214; F05D 2260/211; F05D 2220/36; F28F 7/02
See application file for complete search history.

(56) References Cited

U.S. PATENT DOCUMENTS

| | | | |
|---|---|---|---|
| 7,866,377 B2 | 1/2011 | Slaughter | |
| 9,885,505 B2 | 2/2018 | Reissner et al. | |
| 10,156,359 B2 | 12/2018 | Zelesky et al. | |
| 10,209,009 B2 | 2/2019 | Gerstler et al. | |
| 10,662,781 B2 | 5/2020 | Mongillo et al. | |
| 10,739,077 B2 | 8/2020 | Gerstler et al. | |
| 2007/0227160 A1 | 10/2007 | Johnson | |
| 2011/0302928 A1* | 12/2011 | Mudawar | F28F 1/022 60/782 |
| 2016/0202003 A1 | 7/2016 | Gerstler et al. | |
| 2016/0334149 A1* | 11/2016 | Reissner | F25B 40/00 |
| 2017/0321607 A1* | 11/2017 | Sweeney | F02C 7/224 |
| 2021/0348561 A1 | 11/2021 | Cocks et al. | |

* cited by examiner

*Primary Examiner* — Ehud Gartenberg
*Assistant Examiner* — Jingchen Liu
(74) *Attorney, Agent, or Firm* — Dority & Manning, P.A.

(57) ABSTRACT

A turbofan engine includes a fan, a core turbine engine having one or more turbines and an exhaust section, and a hydrogen-exhaust gas heat exchanger in flow communication with the exhaust section and hydrogen flowing along a hydrogen supply line. The hydrogen-exhaust gas heat exchanger defines a load capacity factor determined by raising a product to a one-quarter power, the product being determined by multiplying a heat transfer surface area density associated with the hydrogen-exhaust gas heat exchanger by a process conductance parameter that relates characteristics of hydrogen, ambient air, and exhaust gas at takeoff, as well as a fan diameter of the fan and a number of turbine stages of the turbofan engine. The load capacity factor is between 4.37 and 28.65 for the fan diameter being between 0.5 and 3.5 meters and the heat transfer surface area density being between 500 $m^2/m^3$ and 10,000 $m^2/m^3$.

20 Claims, 10 Drawing Sheets (1) $\quad LCF = (HTSAD * PCP)^{1/4}$ (2) $\quad HTSAD = A_{HT}/V_{HT}$ (3) $\quad PCP = \left|\dfrac{T_{EG}-T_{Amb}}{T_{H2\ Crit}-T_{Amb}}\right| * (\dot{m}_{EG}/m_{H2\ Crit}) * (D_{Fan}/N_{Turb})$ (4) $\quad m_{H2\ Crit} = \rho_{H2\ Crit} * \left(\dfrac{2*(P_{H2\ Crit}-P_{Amb})}{\rho_{H2\ Crit}}\right)^{\frac{1}{2}} * A_{1"\ Pipe\ ID}$

FIG. 6

| ENGINE PARAMETERS | EXAMPLE 1 | EXAMPLE 2 | EXAMPLE 3 |
|---|---|---|---|
| HTSAD (m2/m3) | 600 | 3000 | 10000 |
| FAN DIAMETER (m) | 0.5 | 2 | 3.5 |
| NUMBER OF TURBINE STAGES (-) | 2 | 5 | 10 |
| EXHAUST GAS TEMPERATURE AT TAKE-OFF (C) | 725 | 950 | 1150 |
| EXHAUST GAS FLOWRATE AT TAKE-OFF (kg/s) | 8 | 90 | 180 |
| LOAD CAPACITY FACTOR (-) | 5.26 | 17.35 | 28.30 |

OPERATING A TURBOFAN ENGINE SO THAT A HYDROGEN-EXHAUST GAS HEAT EXCHANGER OF THE TURBOFAN ENGINE PROCESSES, USING EXHAUST GAS PRODUCED BY THE TURBOFAN ENGINE, A HEAT DUTY OF HYDROGEN BEING DELIVERED TO A COMBUSTION SECTION OF THE TURBOFAN ENGINE, THE TURBOFAN ENGINE HAVING ONE OR MORE TURBINES AND A FAN,

THE HYDROGEN-EXHAUST GAS HEAT EXCHANGER DEFINING A LOAD CAPACITY FACTOR BEING DETERMINED BY RAISING A PRODUCT TO A ONE-QUARTER POWER, THE PRODUCT BEING DETERMINED BY MULTIPLYING A HEAT TRANSFER SURFACE AREA DENSITY ASSOCIATED WITH THE HYDROGEN-EXHAUST GAS HEAT EXCHANGER BY A PROCESS CONDUCTANCE PARAMETER THAT RELATES AN EXHAUST GAS TEMPERATURE AT TAKEOFF, AN AMBIENT AIR TEMPERATURE AT TAKEOFF, A CRITICAL TEMPERATURE OF HYDROGEN, AN EXHAUST GAS MASS FLOWRATE AT TAKEOFF, A MASS FLOWRATE FACTOR OF HYDROGEN AT CRITICAL CONDITION, FAN DIAMETER OF THE FAN, AND A NUMBER OF TURBINE STAGES OF THE ONE OR MORE TURBINES, AND

WHEREIN THE LOAD CAPACITY FACTOR IS BETWEEN 4.37 AND 28.65 FOR THE FAN DIAMETER OF THE FAN BEING BETWEEN 0.5 AND 3.5 METERS AND THE HEAT TRANSFER SURFACE AREA DENSITY BEING BETWEEN 500 $m^2/m^3$ AND 10,000 $m^2/m^3$

*FIG. 15*

HYDROGEN-EXHAUST GAS HEAT EXCHANGER OF A TURBOFAN ENGINE

FIELD

The present disclosure relates to a hydrogen-exhaust gas heat exchanger for a turbofan engine.

BACKGROUND

Recently, there has been a push toward developing hydrogen-powered turbofan engines for aircraft, or rather, turbofan engines that utilize hydrogen as the fuel source. In some instances, hydrogen can be stored as a liquid in one or more tanks at cryogenic temperatures, such as at negative two hundred fifty degrees Celsius (−250° C.). Delivering hydrogen from the one or more tanks for combustion may present certain challenges.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 6 lists various relationships between hydrogen-exhaust gas heat exchanger characteristics and operational and architectural characteristics of a turbofan engine in accordance with an example embodiment of the present disclosure;

FIG. 15 provides a flow diagram for a method of operating a turbofan engine having a hydrogen-exhaust gas heat exchanger in accordance with an example embodiment of the present disclosure.

DETAILED DESCRIPTION

Figure 1:
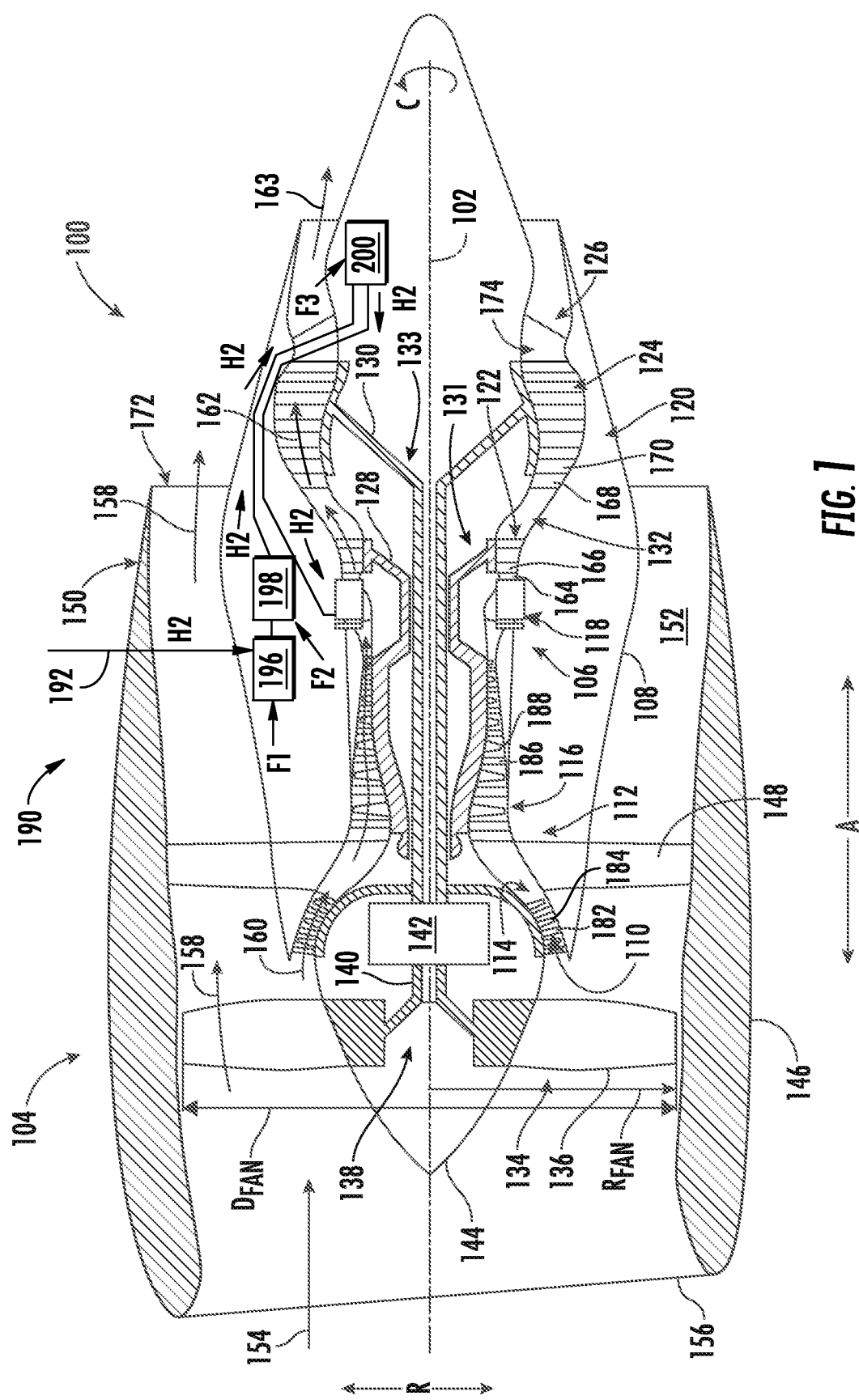
FIG. 1 provides a schematic cross-sectional view of a turbofan engine in accordance with an example embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers only A, only B, only C, or any combination of A, B, and C.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In an effort to further curb or eliminate carbon emissions, engine designers have recently pushed toward hydrogen-powered turbofan engines for aircraft, or rather, turbofan engines that utilize hydrogen as a fuel source for combustion. Hydrogen, the most abundant element in the universe, produces no carbon dioxide emissions when burned. Despite the benefits of using hydrogen over conventional fossil fuel sources, there are certain challenges associated with using hydrogen as the fuel source for turbofan engines. For instance, the inventors of the present disclosure have recognized that increasing a temperature of hydrogen, which is commonly stored as a liquid at cryogenic temperatures, to a temperature more suitable for combustion presents certain challenges. Pre-heating hydrogen to the needed combustion temperature for combustion may facilitate better fuel efficiency.

The inventors of the present disclosure developed architectures for a turbofan engine having a hydrogen-exhaust gas heat exchanger operable to facilitate heat exchange between hydrogen being delivered for combustion and exhaust gas produced by the turbofan engine. Particularly, the inventors proceeded in the manner of designing turbofan engines with given fan characteristics, turbomachine characteristics (e.g., number of turbine stages), and hydrogen-exhaust gas heat exchanger characteristics; checking the potential of the hydrogen-exhaust gas heat exchanger to process the heat duty of hydrogen being delivered for combustion; redesigning the turbofan engine and/or the hydrogen-exhaust gas heat exchanger by varying the fan, turbomachine characteristics (e.g., the number of turbine stages), and/or hydrogen-exhaust gas heat exchanger characteristics; and rechecking the potential of the hydrogen-exhaust gas heat exchanger to process the heat duty of hydrogen being delivered for combustion of the redesigned turbofan engine and/or hydrogen-exhaust gas heat exchanger during the design of several different types of turbofan engines, including the gas turbine engine described below with reference to FIG. 1.

During the course of this practice of studying/evaluating various fan characteristics, turbomachine characteristics (e.g., number of turbine stages), and hydrogen-exhaust gas heat exchanger characteristics considered feasible for best satisfying mission requirements, the inventors unexpectedly discovered that a certain relationship exists between a compactness of the hydrogen-exhaust gas heat exchanger and a flow potential of the process fluid, or exhaust gas in this instance. The relationship between the compactness of the hydrogen-exhaust gas heat exchanger and the flow potential of the process fluid is captured by a load capacity factor. The load capacity factor can be thought of as an indicator of the compactness and effectiveness of a hydrogen-exhaust gas heat exchanger to process the heat duty of hydrogen being delivered for combustion given the architectural arrangement of the turbofan engine and the hydrogen-exhaust gas heat exchanger, and in addition, an indication of an improvement in the turbofan and/or hydrogen-exhaust gas heat exchanger packaging, weight, and ability to pre-heat hydrogen to the needed combustion temperature for combustion.

Referring now to the drawings, FIG. 1 provides a schematic cross-sectional view of a turbofan engine 100 according to an example embodiment of the present disclosure. For the depicted embodiment of FIG. 1, the turbofan engine 100 is an aeronautical, high-bypass turbofan engine configured to be mounted to an aircraft, e.g., in an under-wing configuration. As shown, the turbofan engine 100 defines an axial direction A, a radial direction R, and a circumferential direction C. The axial direction A extends parallel to or coaxial with a longitudinal centerline 102 defined by the turbofan engine 100.

The turbofan engine 100 includes a fan section 104 and a core turbine engine 106 disposed downstream of the fan section 104. The core turbine engine 106 includes an engine cowl 108 that defines an annular core inlet 110. The engine cowl 108 encases, in a serial flow relationship, a compressor section 112 including a first, booster or LP compressor 114 and a second, HP compressor 116; a combustion section 118; a turbine section 120 including a first, HP turbine 122 and a second, LP turbine 124; and an exhaust section 126. The compressor section 112, combustion section 118, turbine section 120, and exhaust section 126 together define a core air flowpath 132 through the core turbine engine 106.

An HP shaft 128 drivingly connects the HP turbine 122 to the HP compressor 116. An LP shaft 130 drivingly connects the LP turbine 124 to the LP compressor 114. The HP shaft 128, the rotating components of the HP compressor 116 that are mechanically coupled with the HP shaft 128, and the rotating components of the HP turbine 122 that are mechanically coupled with the HP shaft 128 collectively form a high pressure spool, or HP spool 131. The LP shaft 130, the rotating components of the LP compressor 114 that are mechanically coupled with the LP shaft 130, and the rotating components of the LP turbine 124 that are mechanically coupled with the LP shaft 130 collectively form a low pressure spool, or LP spool 133.

The fan section 104 includes a fan assembly 138 having a fan 134 mechanically coupled with a fan rotor 140. The fan 134 has a plurality of fan blades 136 circumferentially-spaced apart from one another. As depicted, the fan blades 136 extend outward from the fan rotor 140 generally along the radial direction R. A power gearbox 142 mechanically couples the LP spool 133 and the fan rotor 140. The power gearbox 142 may also be called a main gearbox. The power gearbox 142 includes a plurality of gears for stepping down the rotational speed of the LP shaft 130 to provide a more efficient rotational fan speed of the fan 134. In other example embodiments, the fan blades 136 of the fan 134 can be mechanically coupled with a suitable actuation member configured to pitch the fan blades 136 about respective pitch axes, e.g., in unison. In some alternative embodiments, the turbofan engine 100 does not include the power gearbox 142. In such alternative embodiments, the fan 134 can be directly mechanically coupled with the LP shaft 130, e.g., in a direct drive configuration.

Referring still to FIG. 1, the fan rotor 140 and hubs of the fan blades 136 are covered by a rotatable spinner 144 aerodynamically contoured to promote an airflow through the plurality of fan blades 136. Additionally, the fan section 104 includes an annular fan casing or outer nacelle 146 that circumferentially surrounds the fan 134 and/or at least a portion of the core turbine engine 106. The nacelle 146 is supported relative to the core turbine engine 106 by a plurality of circumferentially-spaced outlet guide vanes 148. A downstream section 150 of the nacelle 146 extends over an outer portion of the core turbine engine 106 so as to define a bypass passage 152 therebetween.

During operation of the turbofan engine 100, a volume of air 154 enters the turbofan engine 100 through an associated inlet 156 of the nacelle 146 and/or fan section 104. As the volume of air 154 passes across the fan blades 136, a first portion of air 158 is directed or routed into the bypass passage 152 and a second portion of air 160 is directed or routed into the core inlet 110. The pressure of the second portion of air 160 is progressively increased as it flows downstream through the LP compressor 114 and HP compressor 116. Particularly, the LP compressor 114 includes sequential stages of LP compressor stator vanes 182 and LP compressor blades 184 that progressively compress the second portion of air 160. The LP compressor blades 184 are mechanically coupled to the LP shaft 130. Similarly, the HP compressor 116 includes sequential stages of HP compressor stator vanes 186 and HP compressor blades 188 that progressively compress the second portion of air 160 even further. The HP compressor blades 188 are mechanically coupled to the HP shaft 128. The compressed second portion of air 160 is then discharged from the compressor section 112 into the combustion section 118.

The compressed second portion of air 160 discharged from the compressor section 112 mixes with fuel and is burned within a combustor of the combustion section 118 to provide combustion gases 162. The combustion gases 162 are routed from the combustion section 118 along a hot gas path 174 of the core air flowpath 132 through the HP turbine 122 where a portion of thermal and/or kinetic energy from the combustion gases 162 is extracted via sequential stages of HP turbine stator vanes 164 and HP turbine blades 166. The HP turbine blades 166 are mechanically coupled to the HP shaft 128. Thus, when the HP turbine blades 166 extract energy from the combustion gases 162, the HP shaft 128 rotates, thereby supporting operation of the HP compressor 116. The combustion gases 162 are routed through the LP turbine 124 where a second portion of thermal and kinetic energy is extracted from the combustion gases 162 via sequential stages of LP turbine stator vanes 168 and LP turbine blades 170. The LP turbine blades 170 are coupled to the LP shaft 130. Thus, when the LP turbine blades 170 extract energy from the combustion gases 162, the LP shaft 130 rotates, thereby supporting operation of the LP compressor 114, as well as the fan 134 by way of the power gearbox 142.

The combustion gases 162 exit the LP turbine 124 and are exhausted from the core turbine engine 106 as exhaust gases or exhaust gas 163. As shown in FIG. 1, the exhaust gas 163 is routed through the exhaust section 126 of the core turbine engine 106 and exhausted therefrom to provide propulsive thrust. Simultaneously, the pressure of the first portion of air 158 is substantially increased as the first portion of air 158 is routed through the bypass passage 152 before the first portion of air 158 is exhausted from a fan nozzle exhaust section 172 of the turbofan engine 100, also providing propulsive thrust. The HP turbine 122, the LP turbine 124, and the exhaust section 126 at least partially define the hot gas path 174.

As further shown in FIG. 1, the turbofan engine 100 includes a hydrogen delivery system 190 for delivering hydrogen H2 to the combustion section 118 for combustion. In this regard, the power source for the turbofan engine 100 of FIG. 1 is hydrogen fuel. The hydrogen delivery system 190 includes a hydrogen supply line 192 that provides flow communication between one or more hydrogen tanks 194 (FIG. 2) and the combustion section 118. Hydrogen can be stored in a liquid state in the one or more hydrogen tanks 194 at low temperatures, such as at negative two hundred fifty degrees Celsius (−250° C.). Alternatively, hydrogen can be stored in a gaseous state in the one or more hydrogen tanks 194 at high pressure. The one or more hydrogen tanks 194 can be stored onboard a fuselage of the aircraft to which the turbofan engine 100 is mounted, for example. To achieve better fuel efficiency, the hydrogen delivery system 190 includes one or more heat exchangers to pre-heat the hydrogen fuel so that the hydrogen fuel delivered to the combustion section 118 is, or within a predetermined range of, a predetermined pre-combustion temperature.

Figure 2:
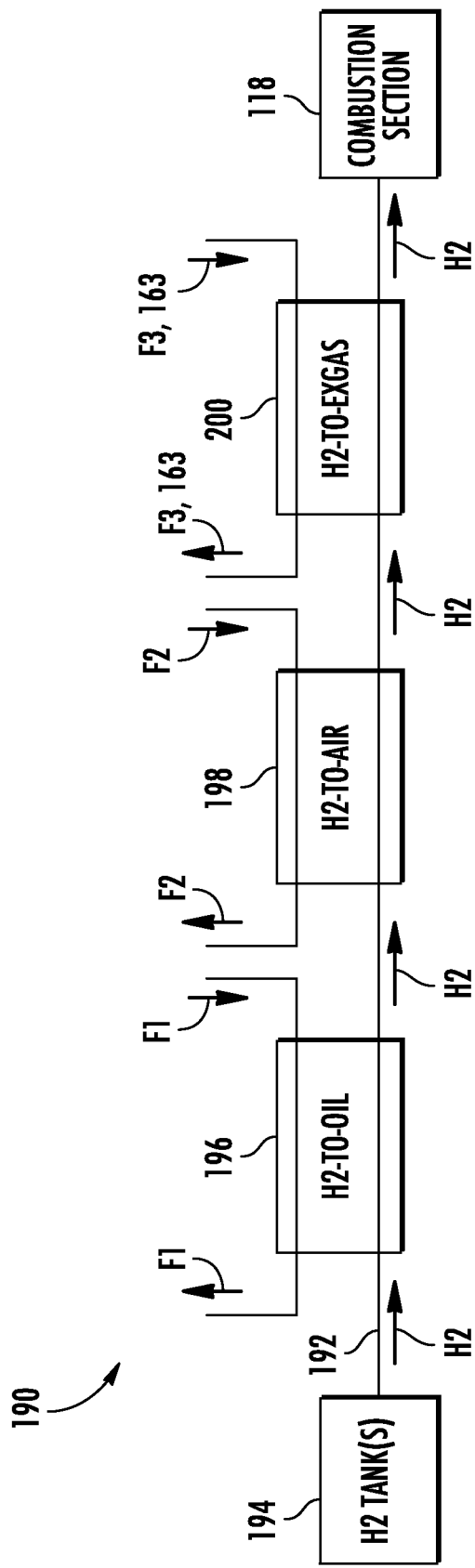
FIG. 2 provides a schematic diagram of a hydrogen delivery system associated with the turbofan engine of FIG. 1.

Particularly, with reference now to FIGS. 1 and 2, FIG. 2 provides a schematic diagram of the hydrogen delivery system 190. As depicted, the hydrogen delivery system 190 includes a first heat exchanger 196 positioned along the hydrogen supply line 192. The first heat exchanger 196 is arranged so that a first fluid F1 imparts thermal energy to hydrogen H2 flowing along the hydrogen supply line 192. In this example embodiment, the first heat exchanger 196 is a hydrogen-to-oil heat exchanger. Accordingly, the first fluid F1 is oil.

The hydrogen delivery system 190 also includes a second heat exchanger 198 positioned along the hydrogen supply line 192 downstream of the first heat exchanger 196. The second heat exchanger 198 is arranged so that a second fluid F2 imparts thermal energy to the hydrogen H2 flowing along the hydrogen supply line 192. In this example embodiment, the second heat exchanger 198 is a hydrogen-to-air heat exchanger. Accordingly, the second fluid F2 is air. The second fluid F2, or air, can be air bled from the core air flowpath 132, e.g., from a station of the turbofan engine 100 between the LP compressor 114 and the HP compressor 116, from a stage of the HP compressor 116, etc. Alternatively, the second fluid F2, or air, can be air bled from the bypass passage 152.

The hydrogen delivery system 190 further includes a third heat exchanger, or hydrogen-exhaust gas heat exchanger 200. The hydrogen-exhaust gas heat exchanger 200 is positioned along the hydrogen supply line 192 downstream of the second heat exchanger 198 and upstream of the combustion section 118. As shown in FIG. 1, the hydrogen-exhaust gas heat exchanger 200 can be positioned inward of the core air flowpath 132 along the radial direction R. The hydrogen-exhaust gas heat exchanger 200 is arranged so that a third fluid F3, or exhaust gas 163 from the exhaust section 126 of the core air flowpath 132 in this example embodiment, imparts thermal energy to the hydrogen H2 flowing along the hydrogen supply line 192. In this regard, the hydrogen-exhaust gas heat exchanger 200 is a hydrogen-to-exhaust gas heat exchanger. The hydrogen-exhaust gas heat exchanger 200 can receive the hydrogen H2 as liquid hydrogen, gaseous hydrogen, or in vapor form.

The first heat exchanger 196, the second heat exchanger 198, and the hydrogen-exhaust gas heat exchanger 200 process a heat duty of the hydrogen H2 flowing along the hydrogen supply line 192 so that hydrogen H2 delivered to the combustion section 118, is or within a predetermined range of, a predetermined pre-combustion temperature. In some example embodiments, the first heat exchanger 196 is configured to process between thirty and forty percent (30-40%) of the heat duty, the second heat exchanger 198 is configured to process between twenty and forty percent (20-40%) of the heat duty, and the hydrogen-exhaust gas heat exchanger 200 is configured to process between thirty and fifty percent (30-50%) of the heat duty of the hydrogen H2 to raise the hydrogen H2 to or within a predetermined range of the predetermined pre-combustion temperature prior to be being delivered to a combustor of the combustion section 118. As one example, the first heat exchanger 196 is configured to process between thirty percent (30%) of the heat duty, the second heat exchanger 198 is configured to process twenty percent (20%) of the heat duty, and the hydrogen-exhaust gas heat exchanger 200 is configured to process fifty percent (50%) of the heat duty of the hydrogen H2 to raise the hydrogen H2 to or within a predetermined range of the predetermined pre-combustion temperature.

In other example embodiments, the first heat exchanger 196 is configured to process between thirty and forty percent (30-40%) of the heat duty, the second heat exchanger 198 is configured to process between thirty and forty percent (30-40%) of the heat duty, and the hydrogen-exhaust gas heat exchanger 200 is configured to process between thirty and forty percent (30-40%) of the heat duty of the hydrogen H2 to raise the hydrogen H2 to or within a predetermined range of the predetermined pre-combustion temperature prior to be being delivered to a combustor of the combustion section 118. As one example, the first heat exchanger 196 is configured to process thirty-three percent (33%) of the heat duty, the second heat exchanger 198 is configured to process thirty percent (30%) of the heat duty, and the hydrogen-exhaust gas heat exchanger 200 is configured to process thirty-seven percent (37%) of the heat duty of the hydrogen H2 to raise the hydrogen H2 to or within a predetermined range of the predetermined pre-combustion temperature.

It will be appreciated that the turbofan engine 100 depicted in FIG. 1 is provided by way of example only, and that in other example embodiments, the turbofan engine 100 may have any other suitable configuration. Additionally, or alternatively, aspects of the present disclosure may be utilized with any other suitable aeronautical turbofan engine, such as a turboshaft engine, turboprop engine, turbojet engine, etc.

Figure 3:
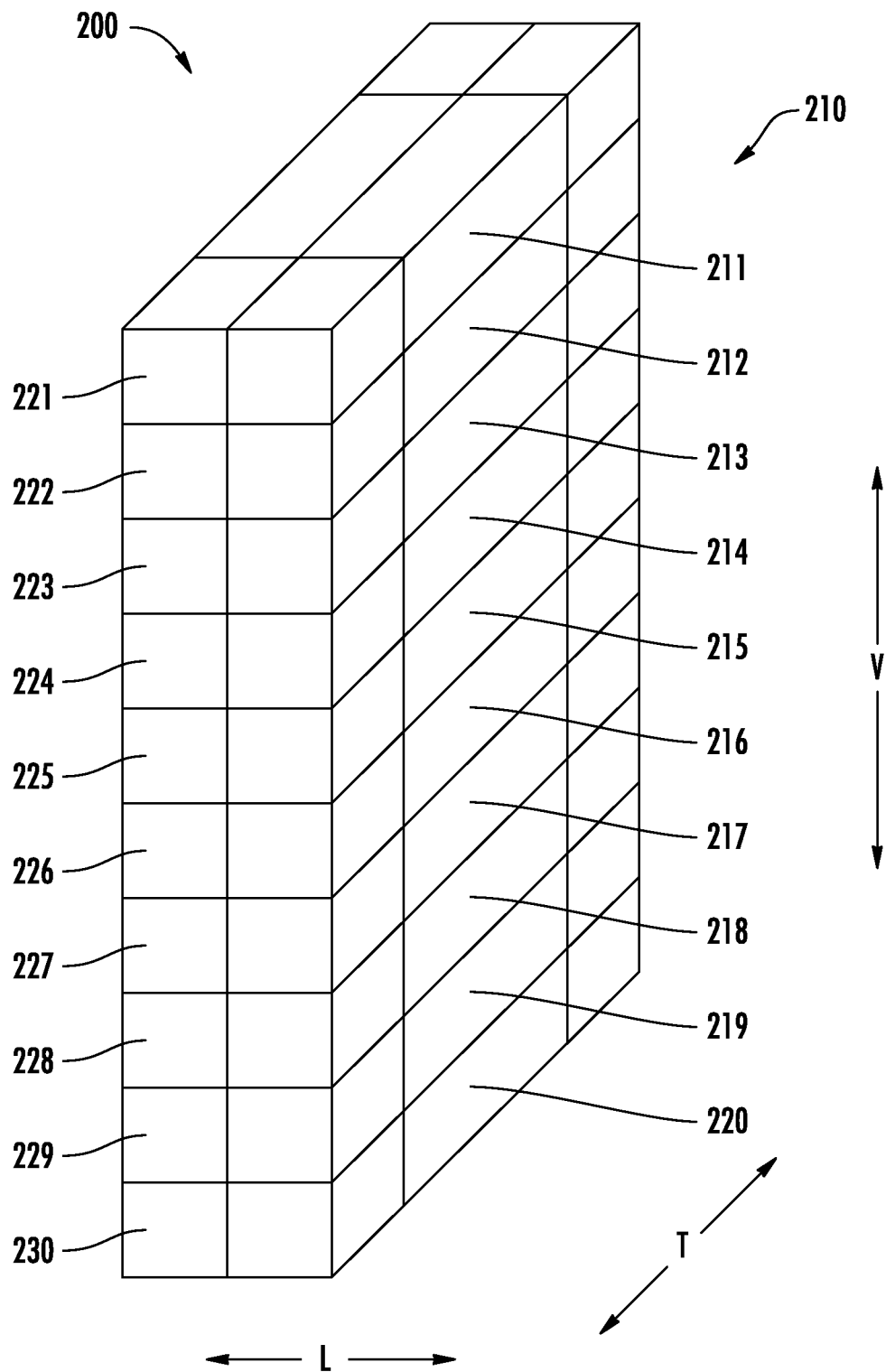
FIG. 3 provides a perspective view of a hydrogen-exhaust gas heat exchanger of the turbofan engine of FIG. 1.

FIG. 3 provides a perspective view of one example configuration of the hydrogen-exhaust gas heat exchanger 200 of FIGS. 1 and 2. The first heat exchanger 196 and the second heat exchanger 198 of FIGS. 1 and 2 may be configured in a same or similar manner as the hydrogen-exhaust gas heat exchanger 200. For instance, the first and second heat exchangers 196, 198 may each include a plurality of exchanger units each having a core defining first and second channels, as provided below.

As depicted in FIG. 3, the hydrogen-exhaust gas heat exchanger 200 defines a vertical direction V, a lateral direction L, and a transverse direction T that are orthogonal to one another. The hydrogen-exhaust gas heat exchanger 200 includes a plurality of exchanger units 210. The exchanger units 210 can be compactly arranged in any suitable configuration. For this embodiment, the hydrogen-exhaust gas heat exchanger 200 includes twenty (20) exchanger units 210, including ten right-side exchanger units 211-220 stacked on top of one another along the vertical direction V and ten left-side exchanger units 221-230 stacked on top of one another along the vertical direction V. Although the hydrogen-exhaust gas heat exchanger 200 of FIG. 3 has twenty exchanger units 210, in other example embodiments, the hydrogen-exhaust gas heat exchanger 200 can include any suitable number of exchanger units, such as one exchanger unit, eight exchanger units, fifty exchanger units, etc. Further, in other embodiments, the exchanger units 210 can be positioned side-by-side rather than stacked on one another.

Figure 4:
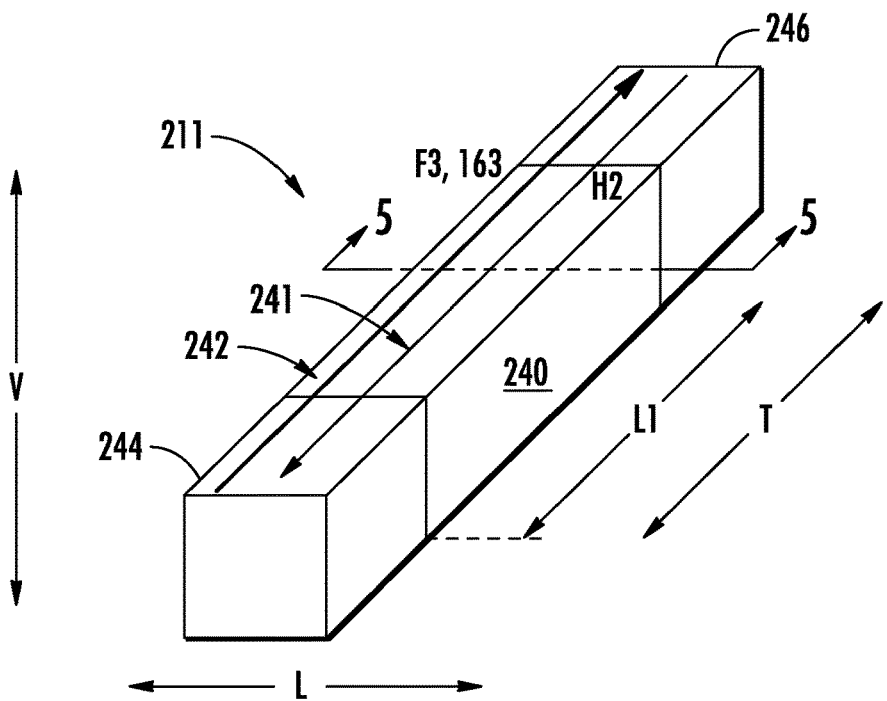
FIG. 4 provides a perspective view of an exchanger unit of the hydrogen-exhaust gas heat exchanger of FIG. 3.
Figure 5:
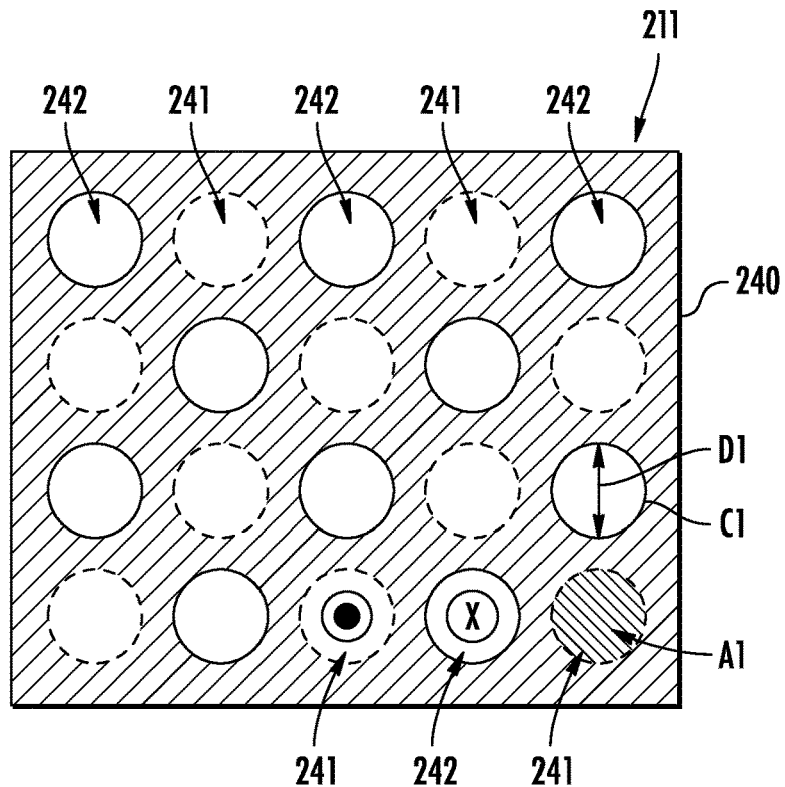
FIG. 5 provides a cross-sectional view of a core of the exchanger unit taken along line 5-5 of FIG. 4.

With reference now to FIGS. 3, 4, and 5, FIG. 4 provides a perspective view of a first exchanger unit 211 of the hydrogen-exhaust gas heat exchanger 200 of FIG. 3. FIG. 5 provides a cross-sectional view of a core of the first exchanger unit 211 taken along line 5-5 of FIG. 4. Generally, each exchanger unit 210 of the hydrogen-exhaust gas heat exchanger 200 has a core and two manifolds. The core of each exchanger unit defines first channels and second channels. The first channels can receive a fluid, such as hydrogen, and the second channels can receive a fluid, such as exhaust gas. The core of one or more of the exchanger units 210 can be formed by a plurality of unit cells arranged in flow communication with one another. Alternatively, the core of one or more of the exchanger units 210 can be formed as monolithic blocks.

By way of example, as depicted, the hydrogen-exhaust gas heat exchanger 200 includes a core 240 defining first channels 241 (outlined by dashed lines in FIG. 5) and second channels 242 (outlined by solid lines in FIG. 5). The first channels 241 can receive hydrogen H2 and the second channels 242 can receive the third fluid F3, which is exhaust gas 163 in this example. The third fluid F3 or exhaust gas 163 flowing through the second channels 242 can be warmer than the hydrogen H2 flowing through the first channels 241. In this way, thermal energy can be exchanged between the third fluid F3 or exhaust gas 163 and the hydrogen H2 as they flow through the first exchanger unit 211. For this embodiment, the hydrogen H2 flowing through the first channels 241 (out of the page as represented by the "circled dot" in FIG. 5) is in crossflow direction with respect to the third fluid F3 or exhaust gas 163 flowing through the second channels 242 (into the page as represented by the "circled X" in FIG. 5).

Although the core 240 of the first exchanger unit 211 is shown in a straight channel configuration in FIG. 4, the core 240 of the first exchanger unit 211 (as well as the cores of the other exchanger units 210) can have other suitable configurations, such as a double U-bend channel configuration, a single U-bend configuration, etc.

The first exchanger unit 211 includes a first manifold 244 and a second manifold 246. Generally, the first manifold 244 distributes the third fluid F3 or exhaust gas 163 to the second channels 242 and receives the hydrogen H2 from the first channels 241. The first manifold 244 can be arranged to keep the hydrogen H2 and the third fluid F3 or exhaust gas 163 fluidly separate. Similarly, the second manifold 246 distributes the hydrogen H2 to the first channels 241 and receives the third fluid F3 from the second channels 242. The second manifold 246 can be arranged to keep the hydrogen H2 and the third fluid F3 fluidly separate. The first manifold 244 and/or second manifold 246 can be in flow communication with a manifold of an adjacent exchanger unit such that the hydrogen H2 and/or the third fluid F3 can flow between exchanger units 210 of the hydrogen-exhaust gas heat exchanger 200.

Each exchanger unit 210 of the hydrogen-exhaust gas heat exchanger 200 can be configured in a same or similar manner as the first exchanger unit 211 provided above. In this way, each exchanger unit 210 of the hydrogen-exhaust gas heat exchanger 200 can have a core arranged in a same or similar manner as the core 240 of the first exchanger unit 211 and two manifolds arranged in a same or similar manner as the first and second manifolds 244, 246 of the first exchanger unit 211. The core of each exchanger unit 210 defines first channels and second channels just as the core 240 defines the defines the first channels 241 and the second channels 242.

As alluded to earlier, the inventors discovered, unexpectedly during the course of engine design, that a relationship exists between the compactness of a hydrogen-exhaust gas heat exchanger, as represented by a heat transfer surface area density, and the flow potential of exhaust gas to process the heat duty of hydrogen, as represented by a process conductance parameter. The process conductance parameter relates an exhaust gas temperature at takeoff, an ambient air temperature at takeoff, a critical temperature of hydrogen, an exhaust gas mass flowrate at takeoff, a mass flowrate factor of hydrogen at critical condition, a fan diameter of the fan, and a number of turbine stages of one or more turbines of a turbofan engine. The relationship between the compactness of a hydrogen-exhaust gas heat exchanger and a flow potential of exhaust gas to process the heat duty of hydrogen is represented by a load capacity factor. The inventors found that a hydrogen-exhaust gas heat exchanger having a load capacity factor within one of the ranges specified herein provides a hydrogen-exhaust gas heat exchanger that is both compact and effective at processing the heat duty associated with hydrogen being delivered for combustion given the flow potential of the exhaust gas produced by the turbofan engine.

The ranges of load capacity factors noted below represent examples of engine designs utilizing hydrogen-exhaust gas heat exchangers that take into consideration the various benefits and penalties of choosing one structural architecture of one hydrogen-exhaust gas heat exchanger and/or turbofan engine over another. In this regard, as discovered by the inventors, the ranges of load capacity factors provided herein strike a balance between the compactness and weight of a hydrogen-exhaust gas heat exchanger, the ability of the hydrogen-exhaust gas heat exchanger to process the heat duty of hydrogen being delivered for combustion, the susceptibility of the channels of the hydrogen-exhaust gas heat exchanger becoming blocked or contaminated, the manufacturability of the hydrogen-exhaust gas heat exchanger, the manufacturability of the turbofan engine, and the impact that the number of turbine stages has on the exhaust gas exiting the turbofan engine as well as the thrust output of the turbofan engine.

In addition to discovering the load capacity factor, the inventors discovered that a relationship exists between the load capacity factor associated with a hydrogen-exhaust gas heat exchanger and a fan diameter of a fan of a turbofan engine. The inventors observed that the load capacity factor increases exponentially the larger the fan diameter of a given turbofan engine. That is, the inventors observed that, as fan diameter increases, flow potential of exhaust gas to the hydrogen-exhaust gas exchanger increases (as represented by the increasing load capacity factor). This discovered relationship can be used advantageously to design hydrogen-powered turbofan engines and their associated hydrogen-exhaust gas heat exchangers.

Further, utilizing the load capacity factor, the inventors found that the number of suitable or feasible engine and/or hydrogen-exhaust gas heat exchanger designs that allow a hydrogen-exhaust gas heat exchanger to meet compactness, weight, and heat duty requirements could be greatly diminished, which can facilitate a more rapid down selection of designs to consider as a turbofan engine having a hydrogen-exhaust gas heat exchanger is developed. Such a benefit provides more insight into the requirements for a given turbofan engine well before specific technologies, integration, and system requirements are developed fully. It may also prevent late-stage redesign. For instance, selection of a hydrogen-exhaust gas heat exchanger's heat transfer surface area density may be facilitated by utilizing a load capacity factor within the ranges provided herein, which may help determine the needed channel diameters and wall thickness of the core of the hydrogen-exhaust gas heat exchanger. Moreover, utilizing a load capacity factor within the ranges provided herein may eliminate or otherwise reduce implementation of heat exchangers having heat transfer surface area density values that are too high, making them not practical to manufacture. Higher heat transfer surface area density values may create higher susceptibility to blocking/contamination of the exchanger channels, which may limit the heat exchanger's effectiveness. Also, utilizing a load capacity factor within the ranges provided herein may facilitate exclusion or reduction of hydrogen-exhaust gas heat exchangers that are bulky.

With reference now to FIGS. 1, 2, 3, 4, 5, and 6, FIG. 6 lists various relationships between hydrogen-exhaust gas heat exchanger characteristics and operational and architectural characteristics of a turbofan engine. Notably, the turbofan engine 100 and the hydrogen-exhaust gas heat exchanger 200 are arranged so that the hydrogen-exhaust gas heat exchanger 200 has a load capacity factor LCF. The load capacity factor LCF is a dimensionless quantity that relates a heat transfer surface area density HTSAD associated with the hydrogen-exhaust gas heat exchanger 200 and a process conductance parameter PCP.

As will be explained more fully below, the heat transfer surface area density HTSAD is a function of the structural architecture of the hydrogen-exhaust gas heat exchanger 200. The process conductance parameter PCP is a measure of the flow potential of the process fluid, which in this instance is exhaust gas. The process conductance parameter PCP is a function of certain aspects of the hydrogen-exhaust gas heat exchanger 200, certain characteristics of hydrogen, conditions associated with the turbofan engine 100 at takeoff, and the architecture of the turbofan engine 100. Specifically, the process conductance parameter PCP relates an exhaust gas temperature at takeoff $T_{EG}$, an ambient air temperature at takeoff $T_{Amb}$, a critical temperature of hydrogen $T_{H2\ Crit}$, an exhaust gas mass flowrate at takeoff $\dot{m}_{EG}$, a mass flowrate factor of hydrogen at critical condition $m_{H2\ Crit}$ a fan diameter $D_{Fan}$ of the fan 134, and a number of turbine stages of one or more turbines $N_{Turb}$ of the turbofan engine 100.

The load capacity factor LCF is defined as a product raised to a one-quarter power (or one-fourth power), wherein the product is determined by multiplying the heat transfer surface area density HTSAD associated with the hydrogen-exhaust gas heat exchanger 200 by the process conductance parameter PCP:

$$LCF = (HTSAD * PCP)^{1/4} \qquad (1)$$

The heat transfer surface area density HTSAD of (1) provides a measure of the compactness of the hydrogen-exhaust gas heat exchanger 200. The heat transfer surface area density HTSAD is defined as a quotient determined by dividing a heat exchanger channel surface area $A_{HT}$ associated with a plurality of channels 241, 242 of the hydrogen-exhaust gas heat exchanger 200 by a heat exchanger channel volume $V_{HT}$ associated with the plurality of channels 241, 242. Stated differently, the heat exchanger channel surface area $A_{HT}$ divided by the heat exchanger channel volume $V_{HT}$ is equal to the heat transfer surface area density HTSAD. The heat exchanger channel surface area $A_{HT}$ is defined by a surface area of the channels 241, 242 of the hydrogen-exhaust gas heat exchanger 200. The heat exchanger channel volume $V_{HT}$ is defined by a volume of the channels 241, 242 of the hydrogen-exhaust gas heat exchanger 200. In this regard, the heat transfer surface area density HTSAD relates the surface area of the channels 241, 242 with the volume of the channels 241, 242. The unit of measure for the heat transfer surface area density HTSAD is meters squared per meters cubed ($m^2/m^3$). The heat transfer surface area density HTSAD is defined by the inventors as follows:

$$HTSAD = A_{HT}/V_{HT} \qquad (2)$$

The heat exchanger channel surface area $A_{HT}$ may be determined as follows. First, the surface area associated with each channel of each core of the hydrogen-exhaust gas heat exchanger 200 is determined. The surface area for a given one of the channels may be defined as a circumference C1 (see FIG. 5 depicting a circumference of one of the second channels 242) of the given channel multiplied by a length L1 (FIG. 4) of the given channel. As will be appreciated, the circumference C1 of the given channel may be defined as the diameter D1 (see FIG. 5 depicting a diameter of one of the second channels 242) of the given channel multiplied by Pi ($\pi$). Second, once the surface area associated with each channel 241, 242 of the core 240 of each exchanger unit 210 of the hydrogen-exhaust gas heat exchanger 200 is determined, the surface area for each channel 241, 242 is summed to determine the heat exchanger channel surface area $A_{HT}$. In this regard, the heat exchanger channel surface area $A_{HT}$ describes the total surface area associated with the channels 241, 242 of the core 240 of each exchanger unit 210 of the hydrogen-exhaust gas heat exchanger 200.

The heat exchanger channel volume $V_{HT}$ may be determined as follows. First, the volume associated with each channel of the core of each exchanger unit 210 is determined. The volume for a given one of the channels may be defined as an area A1 of the given channel (represented in FIG. 5 by the cross hatching in one of the first channels 241) multiplied by the length L1 of the given channel. As will be appreciated, the area A1 of the given channel may be defined as the diameter D1 squared multiplied by Pi ($\pi$) multiplied by one quarter, or stated differently, the radius of the given channel squared multiplied by Pi ($\pi$). Second, once the volume associated with each channel of the core of each exchanger unit 210 of the hydrogen-exhaust gas heat exchanger 200 is determined, the volume for each channel is summed to determine the heat exchanger channel volume $V_{HT}$. In this regard, the heat exchanger channel volume $V_{HT}$ describes the total volume associated with the channels 241, 242 of the core 240 of each exchanger unit 210 of the hydrogen-exhaust gas heat exchanger 200.

The process conductance parameter PCP of (1) is defined as a product determined by multiplying an absolute value of a first quotient by a second quotient and by a third quotient. The first quotient is determined by dividing a first difference determined by subtracting the ambient air temperature at takeoff $T_{Amb}$ from the exhaust gas temperature at takeoff $T_{EG}$ by a second difference determined by subtracting the ambient air temperature at takeoff $T_{Amb}$ from the critical temperature of hydrogen $T_{H2\ Crit}$. The second quotient is determined by dividing the exhaust gas mass flowrate at takeoff $\dot{m}_{EG}$ by the mass flowrate factor of hydrogen at critical condition $m_{H2\ Crit}$. The third quotient is determined by dividing the fan diameter $D_{FAN}$ of the fan 134 by the number of turbine stages of the one or more turbines $N_{Turb}$ of the turbofan engine 100. The unit of measure for the process conductance parameter PCP is meters (m). The process conductance parameter PCP is defined by the inventors as follows:

$$PCP = \left| \frac{T_{EG} - T_{Amb}}{T_{H2\ Crit} - T_{Amb}} \right| * (\dot{m}_{EG} / m_{H2\ Crit}) * (D_{Fan} / N_{Turb}) \quad (3)$$

The ambient air temperature at takeoff $T_{Amb}$ corresponds to a normalized ambient air temperature, which is taken as fifteen degrees Celsius (15° C.). The unit of measure of the ambient air temperature at takeoff $T_{Amb}$ is degrees Celsius. The exhaust gas temperature at takeoff $T_{EG}$ is a normalized temperature of the exhaust gas exhausted from the exhaust section 126 at takeoff. The unit of measure of the exhaust gas temperature at takeoff $T_{EG}$ is degrees Celsius. The critical temperature of hydrogen $T_{H2\ Crit}$ corresponds to a liquid-vapor critical temperature of hydrogen, which corresponds to negative two hundred thirty-nine and ninety-five hundredths degrees Celsius (−239.95° C.). The unit of measure of the critical temperature of hydrogen $T_{H2\ Crit}$ is degrees Celsius. The exhaust gas mass flowrate at takeoff $\dot{m}_{EG}$ corresponds to a mass flowrate through the exhaust section 126 of the turbofan engine 100 at takeoff taken at a maximum takeoff thrust setting associated with the turbofan engine 100. The unit of measure of the exhaust gas mass flowrate at takeoff $\dot{m}_{EG}$ is kilograms per second (kg/s).

The fan diameter $D_{FAN}$ is defined as a distance spanning between a leading edge tip of one fan blade 136 to a leading edge tip of a radially opposite fan blade 136. Stated another way, the fan diameter $D_{FAN}$ may be defined as a fan radius $R_{FAN}$ multiplied by two, or stated mathematically, as $D_{FAN} = R_{FAN} * 2$, wherein the fan radius $R_{FAN}$ spans from the longitudinal centerline 102 to a leading edge tip of one of the fan blades 136. In some example embodiments, the fan diameter $D_{FAN}$ of the fan 134 of the turbofan engine 100 is between 0.5 m and 3.5 m. In instances in which the fan section 104 includes a plurality of fan stages, the fan diameter $D_{FAN}$ is to be determined based on the fan having the largest fan diameter.

The number of turbine stages $N_{Turb}$ of the turbofan engine is defined as the number of stages of a turbine section of the turbofan engine. The turbine section of a turbofan engine can include one or more turbines. As one example, a turbine section of a turbofan engine can include a high pressure turbine and a low pressure turbine. The high pressure turbine and the low pressure turbine can both include one or more stages. As another example, a turbine section of a turbofan engine can include a high pressure turbine, an intermediate pressure turbine, and a low pressure turbine. The high pressure turbine, the intermediate pressure turbine, and the low pressure turbine can all include one or more stages. As used herein, a "turbine stage" is defined as an array of airfoils that are mechanically coupled with a shaft of a turbofan engine and rotatable a longitudinal centerline of the turbofan engine.

By way of example, the number of turbine stages $N_{Turb}$ of the turbofan engine 100 of FIG. 1 is seven (7). As shown, the turbine section 120 includes two turbines, including the HP turbine 122 and the LP turbine 124. The HP turbine 122 includes a first array of airfoils (the lead line of 166 is pointing to one airfoil of the first array in FIG. 1) that are rotatable the longitudinal centerline 102. The airfoils of the first array are mechanically coupled with the HP shaft 128. The HP turbine 122 also includes a second array of airfoils that are rotatable the longitudinal centerline 102. The second array of airfoils is positioned aft of the first array along the axial direction A; an array of stator vanes is positioned between the first and second arrays along the axial direction A. The airfoils of the second array are mechanically coupled with the HP shaft 128. The rotating airfoils of the first and second arrays are labeled as HP turbine blades 166 in FIG. 1. Accordingly, for this embodiment, the HP turbine 122 has two (2) stages.

The LP turbine 124 includes five (5) arrays of airfoils that are rotatable the longitudinal centerline 102. The rotating airfoils of the arrays of the LP turbine 124 are labeled as LP turbine blades 170 in FIG. 1. An array of stator vanes is positioned between each adjacent pair of airfoils that are rotatable the longitudinal centerline 102. The arrays of stator vanes are labeled as LP turbine stator vanes 168 in FIG. 1. The five (5) arrays of airfoils that are rotatable the longitudinal centerline 102 are mechanically coupled with the LP shaft 130. Thus, the LP turbine 124 has five (5) stages. Accordingly, the HP turbine 122 has two (2) stages and the LP turbine 124 has five (5) stages, and thus, the turbine section 120 of the turbofan engine 100 of FIG. 1 has seven (7) stages. In this regard, the number of turbine stages $N_{Turb}$ of the turbofan engine 100 of FIG. 1 is equal to seven (7).

In some embodiments, the number of turbine stages $N_{Turb}$ of the turbofan engine is between 2 and 10, including endpoints 2 and 10. In some embodiments, the number of turbine stages $N_{Turb}$ of the turbofan engine is between 5 and 10, including endpoints 5 and 10. In other embodiments, the number of turbine stages $N_{Turb}$ of the turbofan engine is between 7 and 10, including endpoints 7 and 10.

The mass flowrate factor of hydrogen at critical condition $m_{H2\ Crit}$ of (3) is defined as a product determined by multiplying a critical density of hydrogen $\rho_{H2\ Crit}$ by a fourth quotient raised to a half power and by a cross-sectional area of a one inch inner diameter pipe $A_{1"\ Pipe\ ID}$. The fourth quotient is determined by dividing a product by the critical density of hydrogen $\rho_{H2\ Crit}$, wherein the product is determined by multiplying two by a third difference determined by subtracting an ambient pressure at takeoff $P_{Amb}$ from a critical pressure of hydrogen $P_{H2\ Crit}$. The hydrogen at critical condition $m_{H2\ Crit}$ is defined by the inventors as follows:

$$m_{H2\ Crit} = \rho_{H2\ Crit} * \left( \frac{2 * (P_{H2\ Crit} - P_{Amb})}{\rho_{H2\ Crit}} \right)^{\frac{1}{2}} * A_{1"\ Pipe\ ID} \quad (4)$$

The critical density of hydrogen $\rho_{H2\ Crit}$ corresponds to a density of hydrogen at the critical point, or rather, the liquid-vapor point. As used herein, the critical density of hydrogen corresponds to 31.36 kg/m³. The unit of measure of the critical density of hydrogen $\rho_{H2\ Crit}$ is kilograms per meters cubed (kg/m³). The critical pressure of hydrogen $P_{H2\ Crit}$ corresponds to a pressure of hydrogen at the critical point, or rather, the liquid-vapor point. As used herein, the critical pressure of hydrogen corresponds to 12.86 bars. The unit of measure of the critical pressure of hydrogen $P_{H2\ Crit}$ is bars. The ambient pressure at takeoff $P_{Amb}$, as used herein, corresponds to one bar (1 bar). The unit of measure of the ambient pressure at takeoff $P_{Amb}$ is bars. The cross-sectional area of a one inch inner diameter pipe $A_{1"\ Pipe\ ID}$ corresponds to seventy-nine hundredths inches squared (0.79 in²), or five and one tenth centimeters squared (5.1 cm²). The unit of measure of the cross-sectional area of a one inch inner diameter pipe $A_{1''\ Pipe\ ID}$ is in inches squared.

Figure 7:
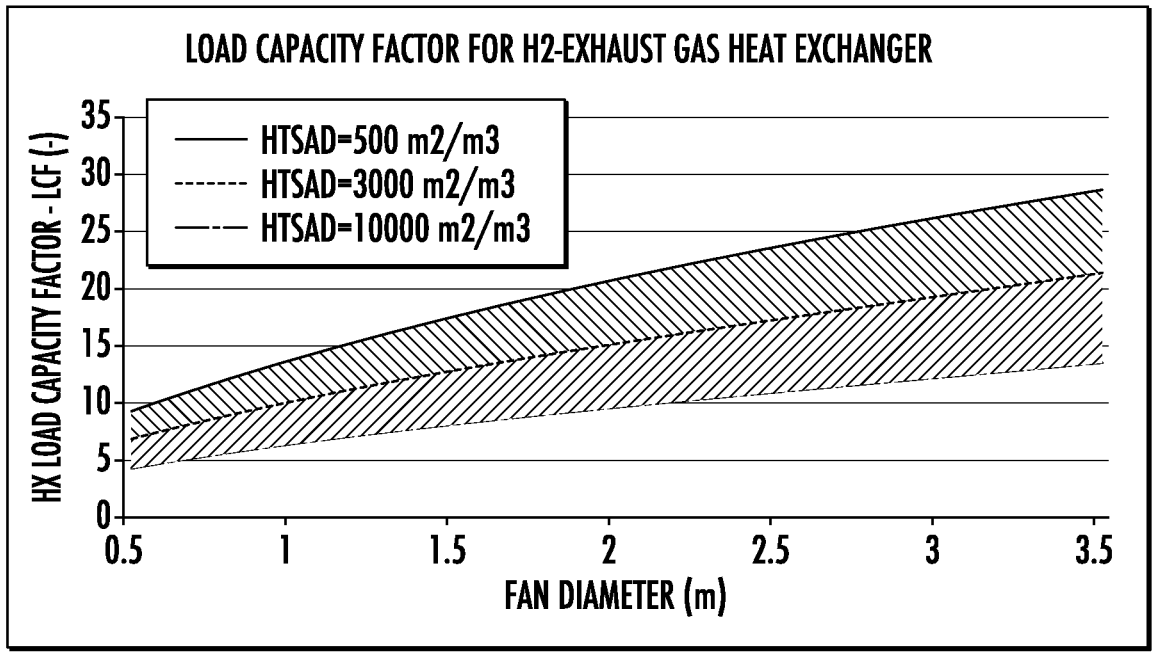
FIGS. 7 through 13 each graphically depict a load capacity factor of a hydrogen-exhaust gas heat exchanger of a turbofan engine as a function of a fan diameter of a fan of the turbofan engine in accordance with example embodiments of the present disclosure.

In some embodiments, the load capacity factor LCF is between 4.37 and 28.65 for the fan diameter $D_{FAN}$ of the fan 134 being between 0.5 and 3.5 meters and the heat transfer surface area density HTSAD being between 500 m²/m³ and 10,000 m²/m³. FIG. 7 graphically depicts the load capacity factor LCF as a function of the fan diameter $D_{FAN}$ for such example embodiments.

Figure 8:
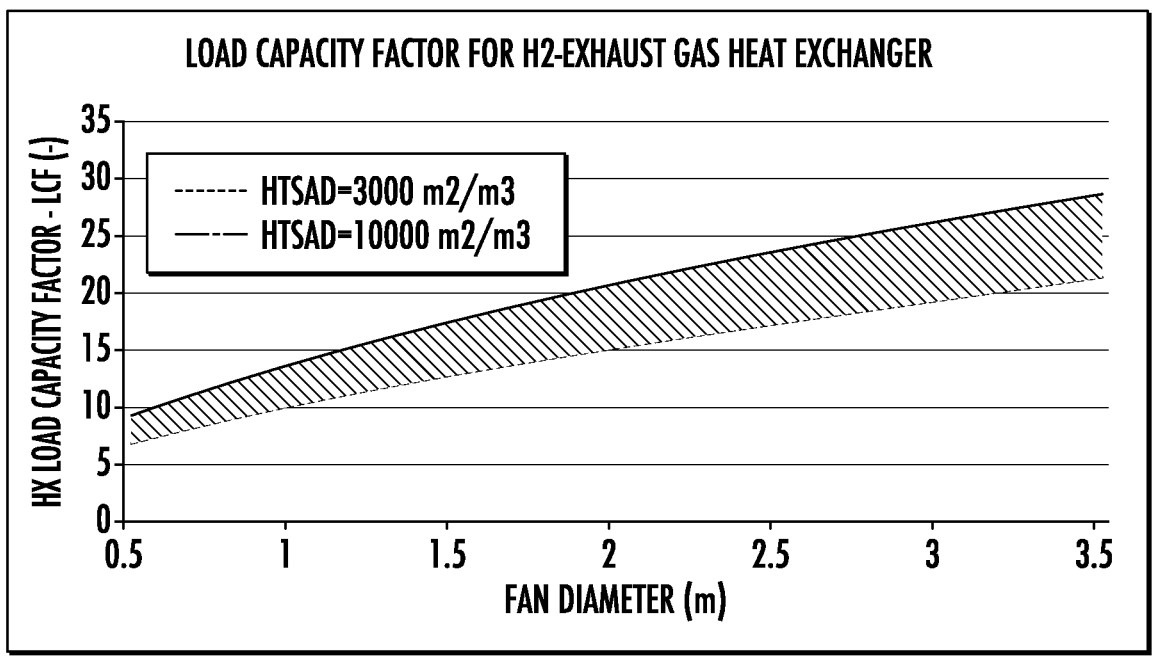

In yet other embodiments, the load capacity factor LCF is between 6.84 and 28.65 for the fan diameter $D_{FAN}$ of the fan 134 being between 0.5 and 3.5 meters and the heat transfer surface area density HTSAD being between 3,000 m²/m³ and 10,000 m²/m³. FIG. 8 graphically depicts the load capacity factor LCF as a function of the fan diameter $D_{FAN}$ for such example embodiments.

Figure 9:
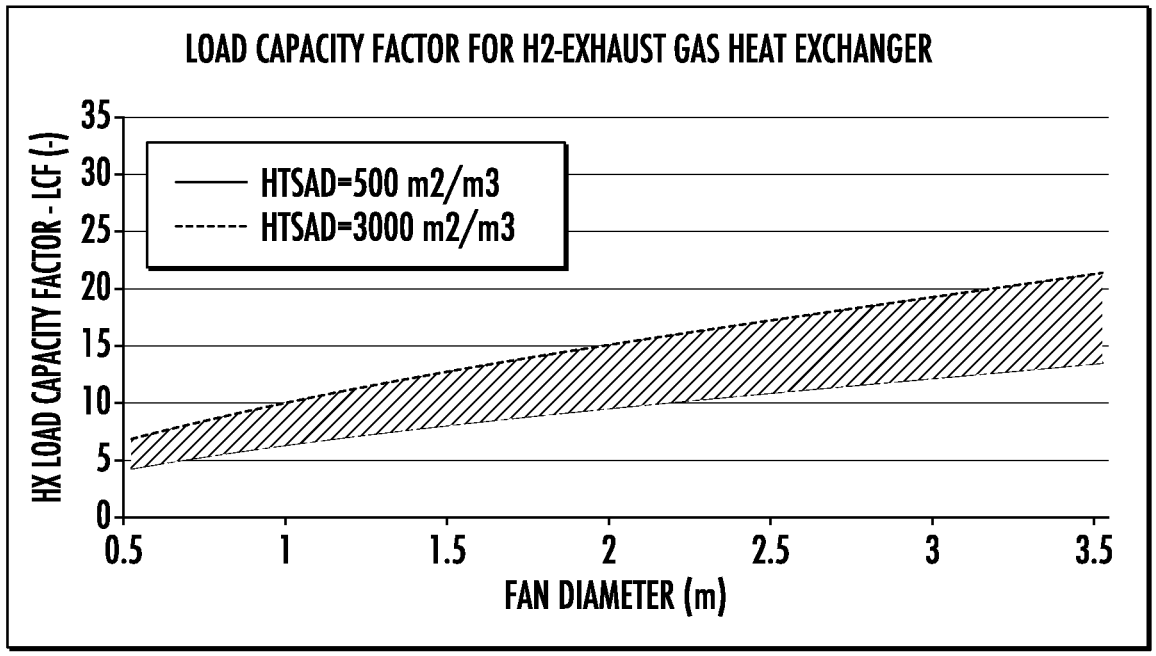

In some further embodiments, the load capacity factor LCF is between 4.37 and 21.20 for the fan diameter $D_{FAN}$ of the fan 134 being between 0.5 and 3.5 meters and the heat transfer surface area density HTSAD being between 500 m²/m³ and 3,000 m²/m³. FIG. 9 graphically depicts the load capacity factor LCF as a function of the fan diameter $D_{FAN}$ for such example embodiments.

Figure 10:
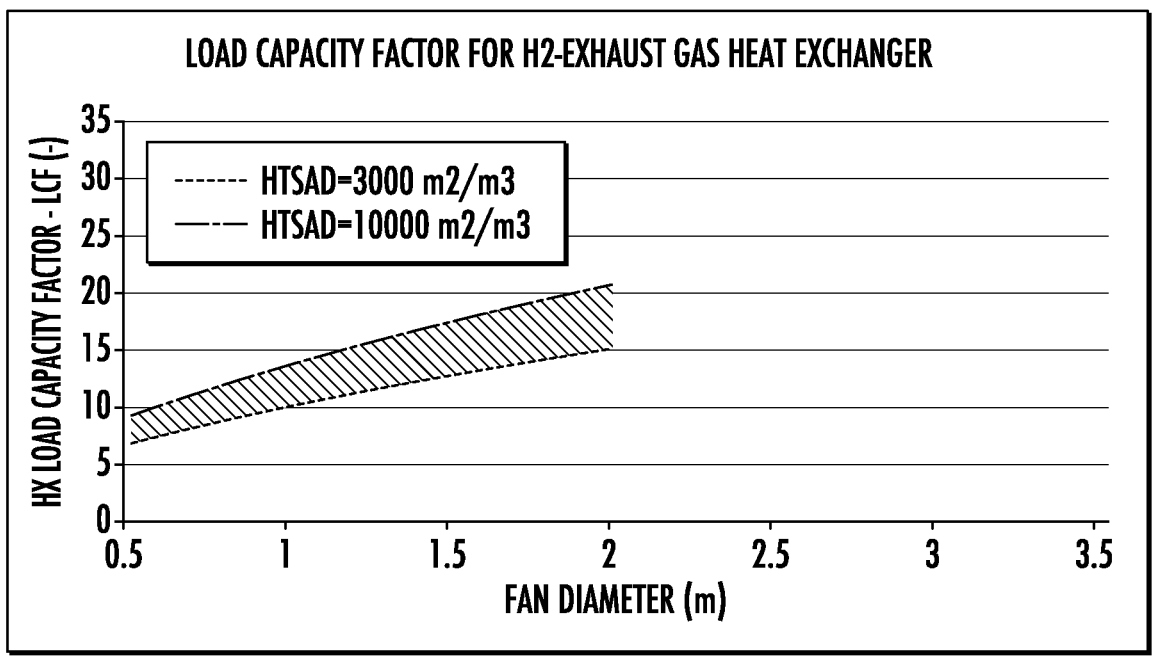

In yet other embodiments, the load capacity factor LCF is between 6.84 and 20.69 for the fan diameter $D_{FAN}$ of the fan 134 being between 0.5 and 2.0 meters and the heat transfer surface area density HTSAD being between 3,000 m²/m³ and 10,000 m²/m³. FIG. 10 graphically depicts the load capacity factor LCF as a function of the fan diameter $D_{FAN}$ for such example embodiments.

Figure 11:
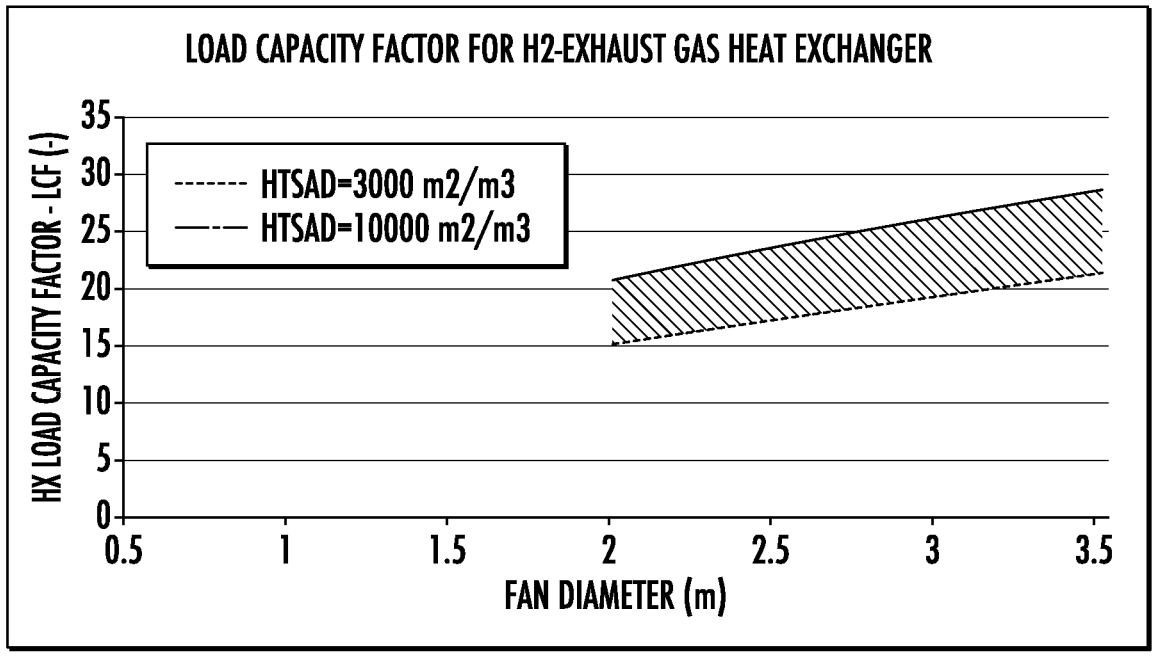

In some other embodiments, the load capacity factor LCF is between 15.31 and 28.65 for the fan diameter $D_{FAN}$ of the fan 134 being between 2.0 and 3.5 meters and the heat transfer surface area density HTSAD being between 3,000 m²/m³ and 10,000 m²/m³. FIG. 11 graphically depicts the load capacity factor LCF as a function of the fan diameter $D_{FAN}$ for such example embodiments.

Figure 12:
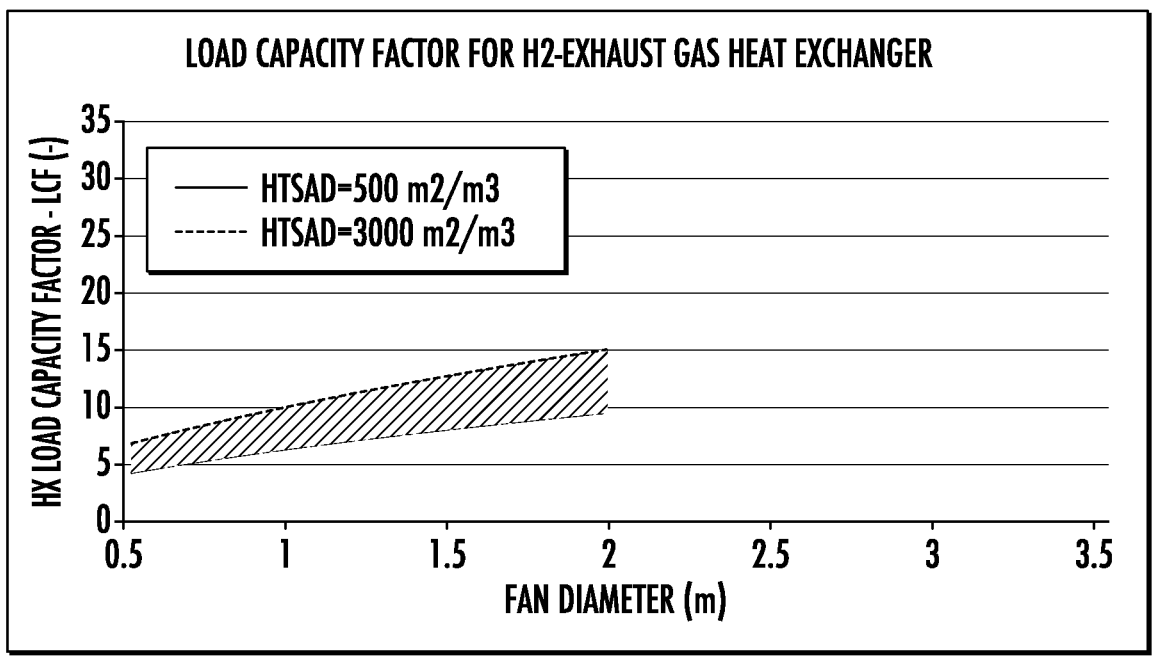

In yet further embodiments, the load capacity factor LCF is between 4.37 and 15.31 for the fan diameter $D_{FAN}$ of the fan 134 being between 0.5 and 2.0 meters and the heat transfer surface area density HTSAD being between 500 m²/m³ and 3,000 m²/m³. FIG. 12 graphically depicts the load capacity factor LCF as a function of the fan diameter $D_{FAN}$ for such example embodiments.

Figures 13, 14:
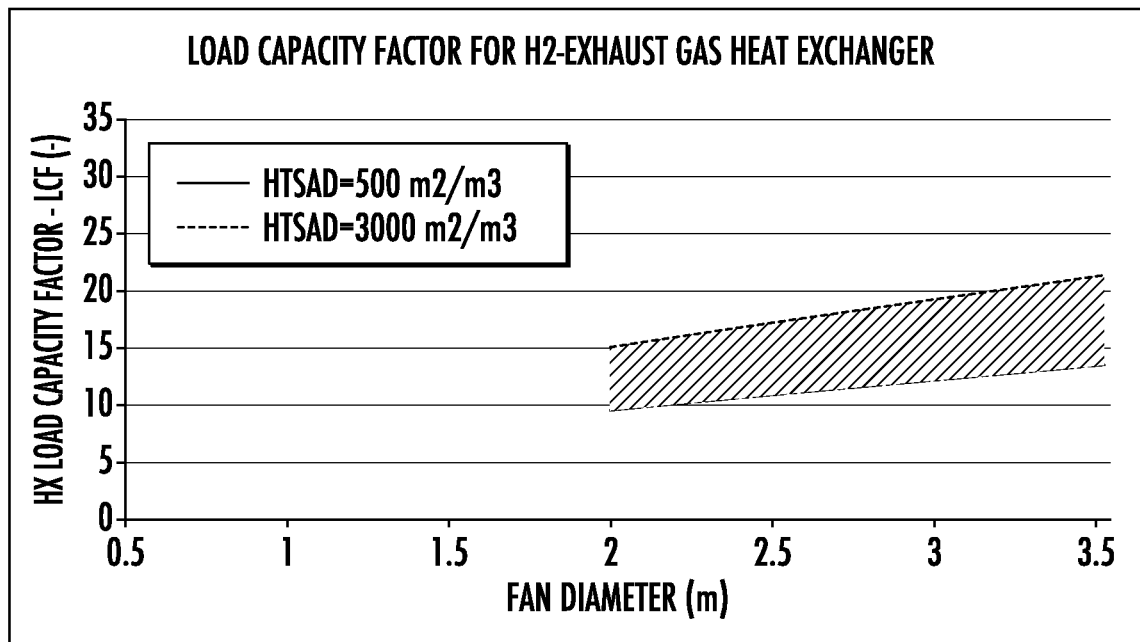
FIG. 14 provides a table listing values for different example turbofan engines in accordance with example embodiments of the present disclosure.

In other embodiments, the load capacity factor LCF is between 9.78 and 21.20 for the fan diameter $D_{FAN}$ of the fan 134 being between 2.0 and 3.5 meters and the heat transfer surface area density HTSAD being between 500 m²/m³ and 3,000 m²/m³. FIG. 13 graphically depicts the load capacity factor LCF as a function of the fan diameter $D_{FAN}$ for such example embodiments.

With reference now to FIG. 14, a table is provided listing various examples.

EXAMPLE 1: In a first example, a turbofan engine includes a hydrogen-exhaust gas heat exchanger. The hydrogen-exhaust gas heat exchanger is arranged so that exhaust gas produced by the turbofan engine imparts thermal energy to hydrogen, e.g., being delivered for combustion. The hydrogen-exhaust gas heat exchanger is further arranged so that the heat transfer surface area density HTSAD associated with the hydrogen-exhaust gas heat exchanger is 600 m²/m³. Further, for the first example, the fan has a fan diameter $D_{FAN}$ of 0.5 m. The turbofan engine has two (2) turbine stages. The exhaust gas temperature at takeoff $T_{EG}$ is seven hundred twenty-five degrees Celsius (725° C.). The exhaust gas mass flowrate at takeoff $\dot{m}_{EG}$ is eight (8) kilograms per second (kg/s). Accordingly, for the first example, the load capacity factor LCF is 5.26.

EXAMPLE 2: In a second example, a turbofan engine includes a hydrogen-exhaust gas heat exchanger. The hydrogen-exhaust gas heat exchanger is arranged so that exhaust gas produced by the turbofan engine imparts thermal energy to hydrogen, e.g., being delivered for combustion. The hydrogen-exhaust gas heat exchanger is further arranged so that the heat transfer surface area density HTSAD associated with the hydrogen-exhaust gas heat exchanger is 3,000 m²/m³. Further, for the second example, the fan has a fan diameter $D_{FAN}$ of 2.0 m. The turbofan engine has five (5) turbine stages. The exhaust gas temperature at takeoff $T_{EG}$ is nine hundred fifty degrees Celsius (950° C.). The exhaust gas mass flowrate at takeoff $\dot{m}_{EG}$ is ninety (90) kilograms per second (kg/s). Accordingly, for the second example, the load capacity factor LCF is 17.35.

EXAMPLE 3: In a third example, a turbofan engine includes a hydrogen-exhaust gas heat exchanger. The hydrogen-exhaust gas heat exchanger is arranged so that exhaust gas produced by the turbofan engine imparts thermal energy to hydrogen, e.g., being delivered for combustion. The hydrogen-exhaust gas heat exchanger is further arranged so that the heat transfer surface area density HTSAD associated with the hydrogen-exhaust gas heat exchanger is 10,000 m²/m³. Further, for the third example, the fan has a fan diameter $D_{FAN}$ of 3.5 m. The turbofan engine has ten (10) turbine stages. The exhaust gas temperature at takeoff $T_{EG}$ is one thousand one hundred fifty degrees Celsius (1,150° C.). The exhaust gas mass flowrate at takeoff $m_{EG}$ is one hundred (180) kilograms per second (kg/s). Accordingly, for the third example, the load capacity factor LCF is 28.30.

FIG. 15 provides a flow diagram for a method 300 of operating a turbofan engine having a hydrogen-exhaust gas heat exchanger. The turbofan engine can be mounted to an aircraft, for example.

At 302, the method 300 includes operating a turbofan engine so that a hydrogen-exhaust gas heat exchanger of the turbofan engine processes, using exhaust gas produced by the turbofan engine, a heat duty of hydrogen being delivered to a combustion section of the turbofan engine, the turbofan engine having one or more turbines and a fan, the hydrogen-exhaust gas heat exchanger defining a load capacity factor being determined by raising a product to a one-quarter power, the product being determined by multiplying a heat transfer surface area density associated with the hydrogen-exhaust gas heat exchanger by a process conductance parameter that relates an exhaust gas temperature at takeoff, an ambient air temperature at takeoff, a critical temperature of hydrogen, an exhaust gas mass flowrate at takeoff, a mass flowrate factor of hydrogen at critical condition, a fan diameter of the fan, and a number of turbine stages of the one or more turbines, and wherein the load capacity factor is between 4.37 and 28.65 for the fan diameter of the fan being between 0.5 and 3.5 meters and the heat transfer surface area density being between 500 m²/m³ and 10,000 m²/m³. The load capacity factor according to such implementations is graphically represented in FIG. 7.

In some implementations, the hydrogen-exhaust gas heat exchanger is one of a plurality of heat exchangers that process the heat duty of hydrogen being delivered to the combustion section. For instance, in some implementations, in operating the turbofan engine, a first heat exchanger upstream of the hydrogen-exhaust gas heat exchanger processes the heat duty of hydrogen being delivered to the combustion section and a second heat exchanger downstream of the first heat exchanger and upstream of the hydrogen-exhaust gas heat exchanger processes the heat duty of hydrogen being delivered to the combustion section.

In some implementations, the turbofan engine includes a hydrogen delivery system for delivering hydrogen to the combustion section for combustion. The hydrogen delivery system includes a hydrogen supply line providing flow communication between a hydrogen tank and the combustion section. The hydrogen delivery system also includes a first heat exchanger positioned along the hydrogen supply line and arranged so that a first fluid imparts thermal energy to hydrogen flowing along the hydrogen supply line. The hydrogen delivery system further includes a second heat exchanger positioned along the hydrogen supply line downstream of the first heat exchanger, the second heat exchanger being arranged so that a second fluid imparts thermal energy to hydrogen flowing along the hydrogen supply line. The hydrogen-exhaust gas heat exchanger is positioned along the hydrogen supply line downstream of the second heat exchanger and upstream of the combustion section. The hydrogen-exhaust gas heat exchanger is arranged so that exhaust gas from an exhaust section of a core air flowpath defined a core turbine engine of the turbofan engine imparts thermal energy to hydrogen flowing along the hydrogen supply line.

In such implementations, in some instances, the first heat exchanger is a hydrogen-to-oil heat exchanger and the second heat exchanger is a hydrogen-to-air heat exchanger. Further, in such implementations, in some instances, the first heat exchanger, the second heat exchanger, and the hydrogen-exhaust gas heat exchanger process the heat duty of hydrogen flowing along the hydrogen supply line so that the hydrogen delivered to the combustion section is, or within a predetermined range of, a predetermined pre-combustion temperature. In some instances, the first heat exchanger processes between thirty and forty percent (30-40%) of the heat duty, the second heat exchanger processes between thirty and forty percent (30-40%) of the heat duty, and the hydrogen-exhaust gas heat exchanger processes between thirty and forty (30-40%) percent of the heat duty. In some instances, the hydrogen-exhaust gas heat exchanger processes a greatest percentage of the heat duty of the hydrogen flowing along the hydrogen supply line.

In some implementations, the hydrogen-exhaust gas heat exchanger includes one or more exchanger units each having a core defining a plurality of channels. The heat transfer surface area density associated with the hydrogen-exhaust gas heat exchanger is defined as a quotient determined by dividing a heat exchanger channel surface area associated with the plurality of channels of the one or more exchanger units to a heat exchanger channel volume associated with the plurality of channels of the one or more exchanger units.

In some implementations, the process conductance parameter is a product determined by multiplying an absolute value of a first quotient by a second quotient and by a third quotient. The first quotient is determined by dividing a first difference determined by subtracting the ambient air temperature at takeoff from the exhaust gas temperature at takeoff by a second difference determined by subtracting the ambient air temperature at takeoff from the critical temperature of hydrogen. The second quotient is determined by dividing the exhaust gas mass flowrate at takeoff by the mass flowrate factor of hydrogen at critical condition. The third quotient is determined by dividing the fan diameter of the fan by the number of turbine stages of the one or more turbines.

In some implementations, the mass flowrate factor of hydrogen at critical condition is a product determined by multiplying a critical density of hydrogen by a fourth quotient raised to a half power and by a cross-sectional area of a one inch inner diameter pipe. The fourth quotient is determined by dividing a product by the critical density of hydrogen, the product being determined by multiplying two by a third difference determined by subtracting an ambient pressure at takeoff from a critical pressure of hydrogen.

In some implementations, the load capacity factor is between 6.84 and 28.65 for the fan diameter of the fan being between 0.5 and 3.5 meters and the heat transfer surface area density being between 3,000 $m^2/m^3$ and 10,000 $m^2/m^3$. The load capacity factor according to such implementations is graphically represented in FIG. 8.

In some other implementations, the load capacity factor is between 4.37 and 21.20 for the fan diameter of the fan being between 0.5 and 3.5 meters and the heat transfer surface area density being between 500 $m^2/m^3$ and 3,000 $m^2/m^3$. The load capacity factor according to such implementations is graphically represented in FIG. 9.

In yet other implementations, the load capacity factor is between 6.84 and 20.69 for the fan diameter of the fan being between 0.5 and 2.0 meters and the heat transfer surface area density being between 3,000 $m^2/m^3$ and 10,000 $m^2/m^3$. The load capacity factor according to such implementations is graphically represented in FIG. 10.

In further implementations, the load capacity factor is between 15.31 and 28.65 for the fan diameter of the fan being between 2.0 and 3.5 meters and the heat transfer surface area density being between 3,000 $m^2/m^3$ and 10,000 $m^2/m^3$. The load capacity factor according to such implementations is graphically represented in FIG. 11.

In some implementations, the load capacity factor is between 4.37 and 15.31 for the fan diameter of the fan being between 0.5 and 2.0 meters and the heat transfer surface area density being between 500 $m^2/m^3$ and 3,000 $m^2/m^3$. The load capacity factor according to such implementations is graphically represented in FIG. 12.

In yet other implementations, the load capacity factor is between 9.78 and 21.20 for the fan diameter of the fan being between 2.0 and 3.5 meters and the heat transfer surface area density being between 500 $m^2/m^3$ and 3,000 $m^2/m^3$. The load capacity factor according to such implementations is graphically represented in FIG. 13.

In some implementations, the number of turbine stages of the one or more turbines is between two (2) and ten (10). In other implementations, the number of turbine stages of the one or more turbines is between five (5) and ten (10). In some implementations, the turbofan engine includes one (1) turbine. In some implementations, the turbofan engine includes two (2) turbines. In some other implementations, the turbofan engine includes three (3) turbines.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A turbofan engine, comprising: a core turbine engine defining a core air flowpath and having one or more turbines; a fan positioned upstream of the core turbine engine; and a hydrogen-exhaust gas heat exchanger in flow communication with an exhaust section of the core air flowpath, the hydrogen-exhaust gas heat exchanger defining a load capacity factor being determined by raising a product to a one-quarter power, the product being determined by multiplying a heat transfer surface area density associated with the hydrogen-exhaust gas heat exchanger by a process conductance parameter that relates an exhaust gas temperature at takeoff, an ambient air temperature at takeoff, a critical temperature of hydrogen, an exhaust gas mass flowrate at takeoff, a mass flowrate factor of hydrogen at critical condition, a fan diameter of the fan, and a number of turbine stages of the one or more turbines, and wherein the load capacity factor is between 4.37 and 28.65 for the fan diameter of the fan being between 0.5 and 3.5 meters and the heat transfer surface area density being between 500 $m^2/m^3$ and 10,000 $m^2/m^3$.

The turbofan engine of any preceding clause, further comprising: a combustion section; a hydrogen supply line providing flow communication between a hydrogen tank and the combustion section; a first heat exchanger positioned along the hydrogen supply line and arranged so that a first fluid imparts thermal energy to hydrogen flowing along the hydrogen supply line; and a second heat exchanger positioned along the hydrogen supply line downstream of the first heat exchanger, the second heat exchanger being arranged so that a second fluid imparts thermal energy to hydrogen flowing along the hydrogen supply line, and wherein the hydrogen-exhaust gas heat exchanger is positioned along the hydrogen supply line downstream of the second heat exchanger and upstream of the combustion section, the hydrogen-exhaust gas heat exchanger being arranged so that exhaust gas from the exhaust section of the core air flowpath imparts thermal energy to hydrogen flowing along the hydrogen supply line.

The turbofan engine of any preceding clause, wherein the first heat exchanger is a hydrogen-to-oil heat exchanger and the second heat exchanger is a hydrogen-to-air heat exchanger.

The turbofan engine of any preceding clause, wherein the first heat exchanger, the second heat exchanger, and the hydrogen-exhaust gas heat exchanger process a heat duty of hydrogen flowing along the hydrogen supply line so that hydrogen delivered to the combustion section is, or within a predetermined range of, a predetermined pre-combustion temperature.

The turbofan engine of any preceding clause, wherein the first heat exchanger is configured to process between thirty and forty percent of the heat duty, the second heat exchanger is configured to process between twenty and forty percent of the heat duty, and the hydrogen-exhaust gas heat exchanger is configured to process between thirty and fifty percent of the heat duty.

The turbofan engine of any preceding clause, wherein the hydrogen-exhaust gas heat exchanger further comprises one or more exchanger units each having a core defining a plurality of channels.

The turbofan engine of any preceding clause, wherein the heat transfer surface area density is defined as a quotient determined by dividing a heat exchanger channel surface area associated with the plurality of channels of the one or more exchanger units to a heat exchanger channel volume associated with the plurality of channels of the one or more exchanger units.

The turbofan engine of any preceding clause, wherein the process conductance parameter is a product determined by multiplying an absolute value of a first quotient by a second quotient and by a third quotient, the first quotient being determined by dividing a first difference determined by subtracting the ambient air temperature at takeoff from the exhaust gas temperature at takeoff by a second difference determined by subtracting the ambient air temperature at takeoff from the critical temperature of hydrogen, the second quotient being determined by dividing the exhaust gas mass flowrate at takeoff by the mass flowrate factor of hydrogen at critical condition, and the third quotient being determined by dividing the fan diameter of the fan by the number of turbine stages of the one or more turbines.

The turbofan engine of any preceding clause, wherein the mass flowrate factor of hydrogen at critical condition is a product determined by multiplying a critical density of hydrogen by a fourth quotient raised to a half power and by a cross-sectional area of a one inch inner diameter pipe, the fourth quotient being determined by dividing a product by the critical density of hydrogen, the product being determined by multiplying two by a third difference determined by subtracting an ambient pressure at takeoff from a critical pressure of hydrogen.

The turbofan engine of any preceding clause, wherein the load capacity factor is between 6.84 and 28.65 for the fan diameter of the fan being between 0.5 and 3.5 meters and the heat transfer surface area density being between 3,000 $m^2/m^3$ and 10,000 $m^2/m^3$.

The turbofan engine of any preceding clause, wherein the load capacity factor is between 4.37 and 21.20 for the fan diameter of the fan being between 0.5 and 3.5 meters and the heat transfer surface area density being between 500 $m^2/m^3$ and 3,000 $m^2/m^3$.

The turbofan engine of any preceding clause, wherein the load capacity factor is between 6.84 and 20.69 for the fan diameter of the fan being between 0.5 and 2.0 meters and the heat transfer surface area density being between 3,000 $m^2/m^3$ and 10,000 $m^2/m^3$.

The turbofan engine of any preceding clause, wherein the load capacity factor is between 15.31 and 28.65 for the fan diameter of the fan being between 2.0 and 3.5 meters and the heat transfer surface area density being between 3,000 $m^2/m^3$ and 10,000 $m^2/m^3$.

The turbofan engine of any preceding clause, wherein the load capacity factor is between 4.37 and 15.31 for the fan diameter of the fan being between 0.5 and 2.0 meters and the heat transfer surface area density being between 500 $m^2/m^3$ and 3,000 $m^2/m^3$.

The turbofan engine of any preceding clause, wherein the load capacity factor is between 9.78 and 21.20 for the fan diameter of the fan being between 2.0 and 3.5 meters and the heat transfer surface area density being between 500 $m^2/m^3$ and 3,000 $m^2/m^3$.

The turbofan engine of any preceding clause, wherein the number of turbine stages of the one or more turbines is between two and ten.

The turbofan engine of any preceding clause, wherein the number of turbine stages of the one or more turbines is between five and ten.

A method, comprising: operating a turbofan engine so that a hydrogen-exhaust gas heat exchanger of the turbofan engine processes, using exhaust gas produced by the turbofan engine, a heat duty of hydrogen being delivered to a combustion section of the turbofan engine, the turbofan engine having one or more turbines and a fan, the hydrogen-exhaust gas heat exchanger defining a load capacity factor being determined by raising a product to a one-quarter power, the product being determined by multiplying a heat transfer surface area density associated with the hydrogen-exhaust gas heat exchanger by a process conductance parameter that relates an exhaust gas temperature at takeoff, an ambient air temperature at takeoff, a critical temperature of hydrogen, an exhaust gas mass flowrate at takeoff, a mass flowrate factor of hydrogen at critical condition, a fan diameter of the fan, and a number of turbine stages of the one or more turbines, and wherein the load capacity factor is between 4.37 and 28.65 for the fan diameter of the fan being between 0.5 and 3.5 meters and the heat transfer surface area density being between 500 $m^2/m^3$ and 10,000 $m^2/m^3$.

The method of any preceding clause, wherein in operating the turbofan engine, a first heat exchanger upstream of the hydrogen-exhaust gas heat exchanger processes the heat duty of hydrogen being delivered to the combustion section and a second heat exchanger downstream of the first heat exchanger and upstream of the hydrogen-exhaust gas heat exchanger processes the heat duty of hydrogen being delivered to the combustion section.

A hydrogen-exhaust gas heat exchanger in flow communication with an exhaust section of a turbofan engine, the hydrogen-exhaust gas heat exchanger comprising: one or more exchanger units each having a core defining a plurality of channels, the hydrogen-exhaust gas heat exchanger defining a load capacity factor being determined by raising a product to a one-quarter power, the product being determined by multiplying a heat transfer surface area density associated with the hydrogen-exhaust gas heat exchanger by a process conductance parameter that relates an exhaust gas temperature of the turbofan engine at takeoff, an ambient air temperature at takeoff, a critical temperature of hydrogen, an exhaust gas mass flowrate at takeoff, a mass flowrate factor of hydrogen at critical condition, a fan diameter of a fan of the turbofan engine, and a number of turbine stages of one or more turbines of the turbofan engine, and wherein the load capacity factor is between 4.37 and 28.65 for the fan diameter of the fan being between 0.5 and 3.5 meters and the heat transfer surface area density being between 500 $m^2/m^3$ and 10,000 $m^2/m^3$.

We claim:

1. A turbofan engine, comprising:
a core turbine engine defining a core air flowpath and having one or more turbines;
a fan positioned upstream of the core turbine engine; and
a hydrogen-exhaust gas heat exchanger in flow communication with an exhaust section of the core air flowpath, the hydrogen-exhaust gas heat exchanger defining a load capacity factor being determined by raising a product to a one-quarter power, the product being determined by multiplying a heat transfer surface area density associated with the hydrogen-exhaust gas heat exchanger by a process conductance parameter that relates an exhaust gas temperature at takeoff, an ambient air temperature at takeoff, a critical temperature of hydrogen, an exhaust gas mass flowrate at takeoff, a mass flowrate factor of hydrogen at critical condition, a fan diameter of the fan, and a number of turbine stages of the one or more turbines, and
wherein the load capacity factor is between 4.37 and 28.65 for the fan diameter of the fan being between 0.5 and 3.5 meters and the heat transfer surface area density being between 500 $m^2/m^3$ and 10,000 $m^2/m^3$.

2. The turbofan engine of claim 1, further comprising:
a combustion section;
a hydrogen supply line providing flow communication between a hydrogen tank and the combustion section;
a first heat exchanger positioned along the hydrogen supply line and arranged so that a first fluid imparts thermal energy to hydrogen flowing along the hydrogen supply line; and
a second heat exchanger positioned along the hydrogen supply line downstream of the first heat exchanger, the second heat exchanger being arranged so that a second fluid imparts thermal energy to hydrogen flowing along the hydrogen supply line, and
wherein the hydrogen-exhaust gas heat exchanger is positioned along the hydrogen supply line downstream of the second heat exchanger and upstream of the combustion section, the hydrogen-exhaust gas heat exchanger being arranged so that exhaust gas from the exhaust section of the core air flowpath imparts thermal energy to hydrogen flowing along the hydrogen supply line.

3. The turbofan engine of claim 2, wherein the first heat exchanger is a hydrogen-to-oil heat exchanger and the second heat exchanger is a hydrogen-to-air heat exchanger.

4. The turbofan engine of claim 2, wherein the first heat exchanger, the second heat exchanger, and the hydrogen-exhaust gas heat exchanger process a heat duty of hydrogen flowing along the hydrogen supply line so that hydrogen delivered to the combustion section, is or within a predetermined range of, a predetermined pre-combustion temperature.

5. The turbofan engine of claim 4, wherein the first heat exchanger is configured to process between thirty and forty percent of the heat duty, the second heat exchanger is configured to process between twenty and forty percent of the heat duty, and the hydrogen-exhaust gas heat exchanger is configured to process between thirty and fifty percent of the heat duty.

6. The turbofan engine of claim 1, wherein the hydrogen-exhaust gas heat exchanger further comprises one or more exchanger units each having a core defining a plurality of channels.

7. The turbofan engine of claim 6, wherein the heat transfer surface area density is defined as a quotient determined by dividing a heat exchanger channel surface area associated with the plurality of channels of the one or more exchanger units to a heat exchanger channel volume associated with the plurality of channels of the one or more exchanger units.

8. The turbofan engine of claim 1, wherein the process conductance parameter is a product determined by multiplying an absolute value of a first quotient by a second quotient and by a third quotient,
the first quotient being determined by dividing a first difference determined by subtracting the ambient air temperature at takeoff from the exhaust gas temperature at takeoff by a second difference determined by subtracting the ambient air temperature at takeoff from the critical temperature of hydrogen, the second quotient being determined by dividing the exhaust gas mass flowrate at takeoff by the mass flowrate factor of hydrogen at critical condition, and the third quotient being determined by dividing the fan diameter of the fan by the number of turbine stages of the one or more turbines.

9. The turbofan engine of claim 8, wherein the mass flowrate factor of hydrogen at critical condition is a product determined by multiplying a critical density of hydrogen by a fourth quotient raised to a half power and by a cross-sectional area of a one inch inner diameter pipe, the fourth quotient being determined by dividing a product by the critical density of hydrogen, the product being determined by multiplying two by a third difference determined by subtracting an ambient pressure at takeoff from a critical pressure of hydrogen.

10. The turbofan engine of claim 1, wherein the load capacity factor is between 6.84 and 28.65 for the fan diameter of the fan being between 0.5 and 3.5 meters and the heat transfer surface area density being between 3,000 $m^2/m^3$ and 10,000 $m^2/m^3$.

11. The turbofan engine of claim 1, wherein the load capacity factor is between 4.37 and 21.20 for the fan diameter of the fan being between 0.5 and 3.5 meters and the heat transfer surface area density being between 500 $m^2/m^3$ and 3,000 $m^2/m^3$.

12. The turbofan engine of claim 1, wherein the load capacity factor is between 6.84 and 20.69 for the fan diameter of the fan being between 0.5 and 2.0 meters and the heat transfer surface area density being between 3,000 $m^2/m^3$ and 10,000 $m^2/m^3$.

13. The turbofan engine of claim 1, wherein the load capacity factor is between 15.31 and 28.65 for the fan diameter of the fan being between 2.0 and 3.5 meters and the heat transfer surface area density being between 3,000 $m^2/m^3$ and 10,000 $m^2/m^3$.

14. The turbofan engine of claim 1, wherein the load capacity factor is between 4.37 and 15.31 for the fan diameter of the fan being between 0.5 and 2.0 meters and the heat transfer surface area density being between 500 $m^2/m^3$ and 3,000 $m^2/m^3$.

15. The turbofan engine of claim 1, wherein the load capacity factor is between 9.78 and 21.20 for the fan diameter of the fan being between 2.0 and 3.5 meters and the heat transfer surface area density being between 500 $m^2/m^3$ and 3,000 $m^2/m^3$.

16. The turbofan engine of claim 1, wherein the number of turbine stages of the one or more turbines is between two and ten.

17. The turbofan engine of claim 1, wherein the number of turbine stages of the one or more turbines is between five and ten.

18. A method, comprising:

operating a turbofan engine so that a hydrogen-exhaust gas heat exchanger of the turbofan engine processes, using exhaust gas produced by the turbofan engine, a heat duty of hydrogen being delivered to a combustion section of the turbofan engine, the turbofan engine having one or more turbines and a fan, the hydrogen-exhaust gas heat exchanger defining a load capacity factor being determined by raising a product to a one-quarter power, the product being determined by multiplying a heat transfer surface area density associated with the hydrogen-exhaust gas heat exchanger by a process conductance parameter that relates an exhaust gas temperature at takeoff, an ambient air temperature at takeoff, a critical temperature of hydrogen, an exhaust gas mass flowrate at takeoff, a mass flowrate factor of hydrogen at critical condition, a fan diameter of the fan, and a number of turbine stages of the one or more turbines, and wherein the load capacity factor is between 4.37 and 28.65 for the fan diameter of the fan being between 0.5 and 3.5 meters and the heat transfer surface area density being between 500 $m^2/m^3$ and 10,000 $m^2/m^3$.

19. The method of claim 18, wherein in operating the turbofan engine, a first heat exchanger upstream of the hydrogen-exhaust gas heat exchanger processes the heat duty of hydrogen being delivered to the combustion section and a second heat exchanger downstream of the first heat exchanger and upstream of the hydrogen-exhaust gas heat exchanger processes the heat duty of hydrogen being delivered to the combustion section.

20. A hydrogen-exhaust gas heat exchanger in flow communication with an exhaust section of a turbofan engine, the hydrogen-exhaust gas heat exchanger comprising:

one or more exchanger units each having a core defining a plurality of channels, the hydrogen-exhaust gas heat exchanger defining a load capacity factor being determined by raising a product to a one-quarter power, the product being determined by multiplying a heat transfer surface area density associated with the hydrogen-exhaust gas heat exchanger by a process conductance parameter that relates an exhaust gas temperature of the turbofan engine at takeoff, an ambient air temperature at takeoff, a critical temperature of hydrogen, an exhaust gas mass flowrate at takeoff, a mass flowrate factor of hydrogen at critical condition, a fan diameter of a fan of the turbofan engine, and a number of turbine stages of one or more turbines of the turbofan engine, and wherein the load capacity factor is between 4.37 and 28.65 for the fan diameter of the fan being between 0.5 and 3.5 meters and the heat transfer surface area density being between 500 $m^2/m^3$ and 10,000 $m^2/m^3$.

* * * * *